United States Patent Office 3,409,079
Patented Nov. 5, 1968

3,409,079
METHOD FOR CONSOLIDATING
INCOMPETENT FORMATIONS
Fred W. Burtch, Pitcairn, Pa., assignor to Gulf Research
& Development Company, Pittsburgh, Pa., a corporation of Delaware
No Drawing. Filed July 9, 1965, Ser. No. 470,878
7 Claims. (Cl. 166—25)

ABSTRACT OF THE DISCLOSURE

An incompetent underground formation is impregnated with a resin-forming material which includes furfuryl alcohol and may include materials that form copolymers with furfuryl alcohol. Then a hot inert gas is displaced through the impregnated formation to cause reaction of the resin-forming material to form a resin permeably bonding together the particles of the formation. A process is described in which the incompetent sands are first cleaned by in-situ combustion, then cooled to below 200° F., then impregnated with resin-forming material, and thereafter the hot inert gas is passed through the impregnated formation.

---

This invention relates to a method for consolidating loose sand formations, particularly incompetent sand formations surrounding a well bore.

Oil bearing sand formations frequently break down and produce sand in the well bore as a result of insufficient cohesion between adjacent sand particles under the conditions prevailing in the well. These formations may break down during the drilling or well completion operations, or they may produce sand when the well is brought into production as a combined effect of the stresses created by the overburden and the flow velocity of the reservoir fluid. This represents a particular problem in sand formations in which there is inadequate natural cementing material to bind the sand grains together. Since the production of sand by the well fluid is very undesirable, many solutions to this problem have been proposed.

One method that has been used in incompetent formations is the placement of a slotted liner in the formation with gravel packing to hold back the sand particles. Another method involves the introduction of a substance into the incompetent formation adjacent to the well bore to supplement any naturally occurring cement and bind the sand particles together into a rigid but permeable formation. Somewhat severe requirements are placed upon this artificially introduced sand cementing material in order that the formation be adequately consolidated against the conditions which can reasonably be anticipated in well preparation or during oil production. This cementing material must both form a strong bond with the individual sand grains as well as have an adequate internal strength. In order to be effective it must be capable of penetrating the formation a critical distance from the well bore and must not substantially decrease the formation permeability. Also for general utility it is desirable that this material be temperature and moisture resistant and withstand ordinary methods of well stimulation including resistance to hot gases, hot water, steam and treating acids.

Those methods which have been used in dealing with incompetent formations have presented a number of disadvantages. When a slotted liner with gravel packing is used, it has been discovered that the sand particles or fines can migrate and plug up the conducting channels in the pack. Sodium silicate or water glass has been tried as a cementing substance, but it has been found that formations consolidated with this material disintegrate in the presence of hot water. Slurries or suspensions of various cementing materials rather than true solutions have been suggested, but these cannot be used with any but the rarely encountered, coarse grain, high permeability formations because the suspended particles will filter off as a cake onto the surface of the formation without any effective penetration into the formation.

Various resin formulations have been used with variable success, however, many problems have arisen in their use. For example, premixing the resin-former with a catalyst places a positive time factor in the operation. Delays or accidents have resulted in the resin polymerizing in the equipment or well bore itself prior to introduction into the formation or in the formation before permeability is regained. Moreover, in an effort to assure adequate retention of permeability in the treated formation, a flushing liquid may be injected for partial displacement of the resin-forming solution or a liquid diluent may be used in the formulation itself which is rejected as the resin shrinks onto the sand grains and sets. Both the adhesive characteristics and the strength of the final resin are adversely affected by these liquid diluents and flushing agents. In addition, the more successful use of these techniques requires great precision with substantial loss of formation permeability still a common result.

In accordance with my invention a stable heat-curable resin-forming material is first introduced into the formation before it is subjected to polymerizing treatment. By this technique the criticality of time prior to injection has been avoided. Unexpected delays or accidents can be accommodated without resulting resinification in the equipment or well bore. This permits much greater flexibility in conducting well operations and relieves the well workers of pressures which might otherwise lead to mistakes and accidents.

A further aspect of my invention is that a gaseous material is used to regain formation permeability after the resin-forming composition has been injected into the formation. This gas will displace excess resin-forming material deeper into the formation leaving only a coating on the sand grains, particularly at the intergranular contacts, and by this technique avoiding the piston-like displacement which would occur with a liquid flush. The curing of the resin-forming material with a hot inert gas forms another aspect of my invention. This inert gas is preferably the gas which is used to regain permeability in the formation as previously discussed. Under this aspect, the hot inert gas is injected into the formation previously saturated with the resin-forming liquid forcing the excess amount of resin precursor out into the formation and curing to a hard resinous bond that portion which remains coated on the sand grains. Under an alternative procedure the permeability of the formation is recovered by using a cool inert gas such as nitrogen or air, and this is followed by the injection of a hot gas to cause the cure. In this procedure the same gas may be used in both stages, merely being heated in the second stage, or different gases may be used such as air at ambient conditions in the first stage followed by its combustion in the second stage with a suitable fuel resulting in the injection of the hot gases of combustion.

In accordance with this process close control of the consolidation operation is possible. The passage of time accompanied by the threat of premature setting of the resin is no longer a critical factor. The resin precursor may be handled above ground or left in the formation after injection for a substantial length of time without hardening, yet when setting is desired, it can be accomplished as quickly as desired. No special-purpose additives are needed in the resin-forming material; and therefore, no reduction in cohesive properties of the resin and no interference with the wetting of or adhesion to the sand grains results. A strong intergranular bonding is thereby accomplished. The resulting formation is a strong durable product possessing up to 85 percent of its original unconsolidated permeability.

In accordance with my invention furfuryl alcohol, or a heat-curable resin-former such as a fluid partial polymer formed by the homopolymerization of furfuryl alcohol or by the partial copolymerization of furfuryl alcohol with another composition is injected into the formation to be consolidated, and this is subsequently fully cured with a hot inert gas to a strongly adherent polymer. Furfuryl alcohol is a very fluid substance having a viscosity of 4.6 centipoises at 25° C. It is volatile at ambient conditions with a boiling point of 170° C. and is soluble in water in all proportions with vigorous agitation aiding dissolution. Its physical properties can be adjusted by partial polymerization under controlled conditions to produce a prepolymer having a viscosity of any desired value, for example, up to one thousand centipoises or more together with a lowered vapor pressure and water solubility.

A furfuryl alcohol prepolymer useful herein can be prepared by the controlled self-condensation of furfuryl alcohol. For example, an amount of furfuryl alcohol can be heated at reflux with ten percent by weight of a 4.25 percent phosphoric acid solution. Reflux is continued for several hours until the desired viscosity is reached. When using this more viscous prepolymer or other partial polymers, it is preferred that up to about one percent of a surfactant such as isooctylamine be incorporated into the material in order to insure complete wetting of the formation particles and ejection of formation water and oil or ejection of a preflush liquid if such has been used. In addition, adjustment of viscosity and curing properties of the prepolymer can be accomplished by its dilution with furfuryl alcohol which co-cures with the prepolymer. Also viscosity adjustment of the prepolymer can less preferably be obtained by using up to about 70 percent of an organic solvent such as benzene or toluene, which is ejected as the curing resin deposits onto the sand grains.

In addition, those liquid partial copolymerization products of furfuryl alcohol with other substances which are curable with a hot inert gas hereunder are usable herein. Examples of this group are partial polymers of furfuryl alcohol with formaldehyde, with urea and formaldehyde, with phenol and formaldehyde and with one or more compounds containing two or more epoxy groups. Such mixed partial polymers are well-known in the art, a specific example being the stable, liquid partial polymer made from about 100 parts by weight of furfuryl alcohol, about 54 parts formaldehyde, and about three parts urea. In another example a mixture of 100 parts by weight of Epon 828, an epoxy resin-former made by Shell Chemical Company, ten parts of furfuryl alcohol, and three parts of boron trifluoride monoethylamine forms a stable mixture having a viscosity of 660 centipoises at 27° C. which will cure to a hard resin above 85° C. Other suitable epoxy resin-formers include Union Carbide Company's ERL 2774 and E.P. 201 (3,4-epoxy-6-methyl-cyclohexylmethyl - 3,4-epoxy-6-methylcyclohexanecarboxylate). In general, these partial copolymers will be made from at least about ten percent furfuryl alcohol and will generally vary in viscosity from 100 to 10,000 centipoises. Formulations of this type or information regarding them are available from The Quaker Oats Company, an example being Furset 4090, a furfuryl alcohol-urea-formaldehyde reaction product having a viscosity of approximately 750 centipoises.

In consolidating sand formations hereunder the furfuryl alcohol or furfuryl alcohol-containing prepolymer is injected into the formation, and this is followed by the injection of an inert gas which drives excess resin-former deeper into the formation sand leaving a coating on the sand grains particularly at the intergranular contacts. This gas may be cool at first and then heated or preferably, it is heated from the start to cure the coating on the grains as the excess resin-former is driven ahead of it. The inert gas may be air, nitrogen, carbon dioxide, one of the rare gases, ammonia, combustion gases, natural gas, and the like. By inert is meant that the gas is nonreactive both with respect to the resin-forming and the resinified material. Since oxygen-rich gases such as air are somewhat reactive with the resin-forming material at the higher range of temperatures, it is preferred that use of such gases be restricted to the lower temperature range. The preferred range for curing furfuryl alcohol and furfuryl alcohol prepolymer is between about 350° to 550° F. with about 375° to 425° F. being the optimum range. I have found that the resin might still be tacky after 24-hour hot gas treatment at 300° F. while the cure at 600° F. is sufficiently rapid that excessive heating may cause a gradual degradation of the cured resin. At 400° F. the curing time is approximately four hours.

Most formations to be treated contain both connate water and an oil phase. It is preferred that the formation to be consolidated be freed of both the water and oil to insure superior consolidation. When the treating liquid is injected into the formation, it will displace the water in the formation driving it ahead into the formation away from the well bore with only slight intermixing. The same is true of a low viscosity oil. However, if the oil is viscous, special consideration must be given to the displacement of this viscous oil. It may be displaced by injecting a low viscosity oil prior to the injection of the treating fluid, or it may be displaced by using a viscous furfuryl alcohol prepolymer containing a suitable surfactant to improve its wetting properties to displace the water and viscous crude from the formation pores. Since furfuryl alcohol monomer preferentially wets the sand grains in the presence of water or hydrocarbon liquids, it will effectively displace both connate water and low viscosity reservoir fluids without requiring a preflush. However, even in this instance a suitable preflush will result in a superior consolidation.

The use of furfuryl alcohol in consolidating sand in accordance with my invention is illustrated in the following experiment. A six-inch long test cell having an inner diameter of 1¼ inches was packed with 70–140 mesh Oklahoma #1 sand. The sand was first saturated with furfuryl alcohol and then heated air was injected into the test cell at a flow rate of 30 s.c.f./ft./hr. at a pressure of about 25 p.s.i. The air was heated in an electric oven which reached a maximum of 1000° F. After reaching a temperature of 400° F., the test cell was held at a temperature between 400° and 600° F. for about 1½ hours by controlling the temperature of the electric oven as air injection was continued at a constant rate. After heating was completed, the sand was found to be well consolidated. Sections of the consolidated cylinder of sand were tested and measured compressive strengths of 705 p.s.i. and 1216 p.s.i. The permeability to kerosene was 4.31 darcys which represented a permeability reduction of about 40 percent.

In consolidations using these resin-forming materials average compressive strengths greater than 500 p.s.i. are regularly achieved with compressive strengths over 2000 p.s.i. and with acceptable permeabilities resulting at optimum conditions. A final permeability of at least about 60 up to 85 percent of the original permeability is desired with the permeability retention in part being dependent upon the viscosity of the treating solution, the less viscous the resin-former the greater the permeability retention. In order to achieve the desired permeability retention it is desirable to reduce the fluid resin-former saturation by the gas flush to at least 30 percent of the pore space by the flushing operation. If a liquid such as kerosene rather than an inert gas is flushed through the treated formation to regain permeability prior to curing, the resin-forming liquid will be over-flushed from the formation resulting in a weakly consolidated sand.

Since the curing rate increases with increasing formation temperature and pressure, these must be correlated in order to accomplish the desired control. It is preferred that the formation temperature be no greater than 250° F. and preferably less than 200° F. so that significant curing will not occur prior to regaining formation permeability. If the formation temperature is higher than desired, a preflush using a suitable cooled liquid will both flush reservoir fluids from the zone to be treated and cool this zone to a preferred temperature. Or, if the formation surrounding the well bore has been burned to clean out the said, it may be cooled by the injection of a suitable quantity of cool water or gas. Furfuryl alcohol monomer is more sensitive to formation conditions than the prepolymer mixture. An elevated temperature in the formation together with a low formation pressure may result in significant evaporation and loss of the monomer necessitating under these conditions the use of a suitable prepolymer formulation. The rate of polymerization is controlled primarily through the compounding of the treating fluid and by the temperature at which curing is effected.

The process is now illustrated in the consolidation of a six-foot pay zone lying between the interval of 3000 feet to 3006 feet. The casing is perforated near the middle of the pay zone with a four-inch single point entry notch using a radial jet. The viscosity of the reservoir crude is 20 centipoises and the temperature and pressure of the formation is 150° F. and 1750 p.s.i. respectively. After establishing gas permeability by injecting air into the formation, a down-hole burner is ignited and operated at 800° F. for about 12 hours to burn the sand clean around the casing notch. The burner is shut off and about 15 barrels of water are injected down the casing to cool the formation. After regaining air permeability, five barrels of a prepolymer of furfuryl alcohol having a viscosity of about 100 centipoises to which has been added 0.50 pound of isooctylamine surfactant per barrel are injected into the formation through the entry point. Pressure is maintained at the wellhead as a down-hole propane burner is lowered near to the point of entry and ignited. Air is pumped to the burner to maintain combustion and the combustion gases enter the formation at a rate of about 2000 s.c.f./min. driving the major portion of the prepolymer ahead into the formation. After injection for two hours at an exhaust temperature of 450° F., the burner temperature is reduced to 400° F. and injection is continued for five hours in accordance with procedures determined by pretesting above ground to establish suitable conditions of operation. At this point, the formation temperature from the well bore to a distance about three feet from the notch is about 400° F. The burner is withdrawn and the well is put into production. The well produces sand-free oil over an extended period of time indicating successful consolidation.

Sand consolidation by furfuryl alcohol and furfuryl alcohol based resin-formers as described herein retains a substantial portion of its original permeability and possesses a good compressive strength. The consolidated formation displays excellent resistance to hexane, benzene, water and reservoir fluid. Further, it retains these properties as long as formation temperatures do not appreciably exceed 600° F. and may be subjected to stimulation techniques such as steam injection and acid stimulation without deterioration. This process is generally useful for the consolidation of underground loose granular formations.

It is to be understood that the above disclosure is by way of specific example and that numerous modifications and variations are available to those of ordinary skill in the art without departing from the true spirit and scope of my invention.

I claim:

1. A method of consolidating incompetent, permeable formations adjacent to underground boreholes which comprises the steps of injecting into said formation a heat-curable resin-forming material, injecting a cool inert gas at a temperature below the curing temperature of the resin into said formation to displace a portion of said resin-forming material further into said formation and reestablish the permeability of said treated formation, and heating the resin-forming material by injecting a hot inert gas into the formation at a temperature higher than the curing temperature of the resin to cure said resin-forming material and consolidate said formation.

2. A method in accordance with claim 1 in which the resin-forming material is selected from the group consisting of furfuryl alcohol, heat-curable prepolymers made from at least ten percent furfuryl alcohol, and mixtures thereof.

3. A method in accordance with claim 2 in which the resin-forming material is furfuryl alcohol.

4. A method in accordance with claim 2 in which the resin-forming material is heated to a temperature between about 300° and 600° F. by the hot inert gas.

5. A method in accordance with claim 2 in which the resin-forming material is the partial polymer of furfuryl alcohol with a member selected from the group consisting of formaldehyde, urea and formaldehyde, phenol and formaldehyde, and an epoxy compound containing at least two epoxy groups.

6. A method in accordance with claim 5 in which the partial polymer is dissolved in furfuryl alcohol.

7. A method in accordance with claim 1 in which the resin-forming material is a liquid partial polymer of furfuryl alcohol.

References Cited

UNITED STATES PATENTS

| | | | |
|---|---|---|---|
| 3,024,215 | 3/1962 | Freeman et al. | |
| 3,121,462 | 2/1964 | Martin et al. | 166—29 |
| 3,330,350 | 7/1967 | Maly | 166—33 X |
| 2,378,817 | 6/1945 | Wrightsman et al. | 166—33 |
| 2,399,055 | 4/1946 | Nordlander | 260—67 |
| 2,787,325 | 4/1957 | Holbrook | 166—33 X |
| 2,796,934 | 6/1957 | Vogel | 166—33 |
| 3,126,959 | 3/1964 | Ortloff | 166—33 |
| 3,199,590 | 8/1965 | Young | 166—33 |

CHARLES E. O'CONNELL, *Primary Examiner.*

IAN A. CALVERT, *Assistant Examiner.*